No. 897,440. PATENTED SEPT. 1, 1908.
R. T. WINGO.
METAL WORKING MACHINE.
APPLICATION FILED JAN. 16, 1904.
3 SHEETS—SHEET 1.
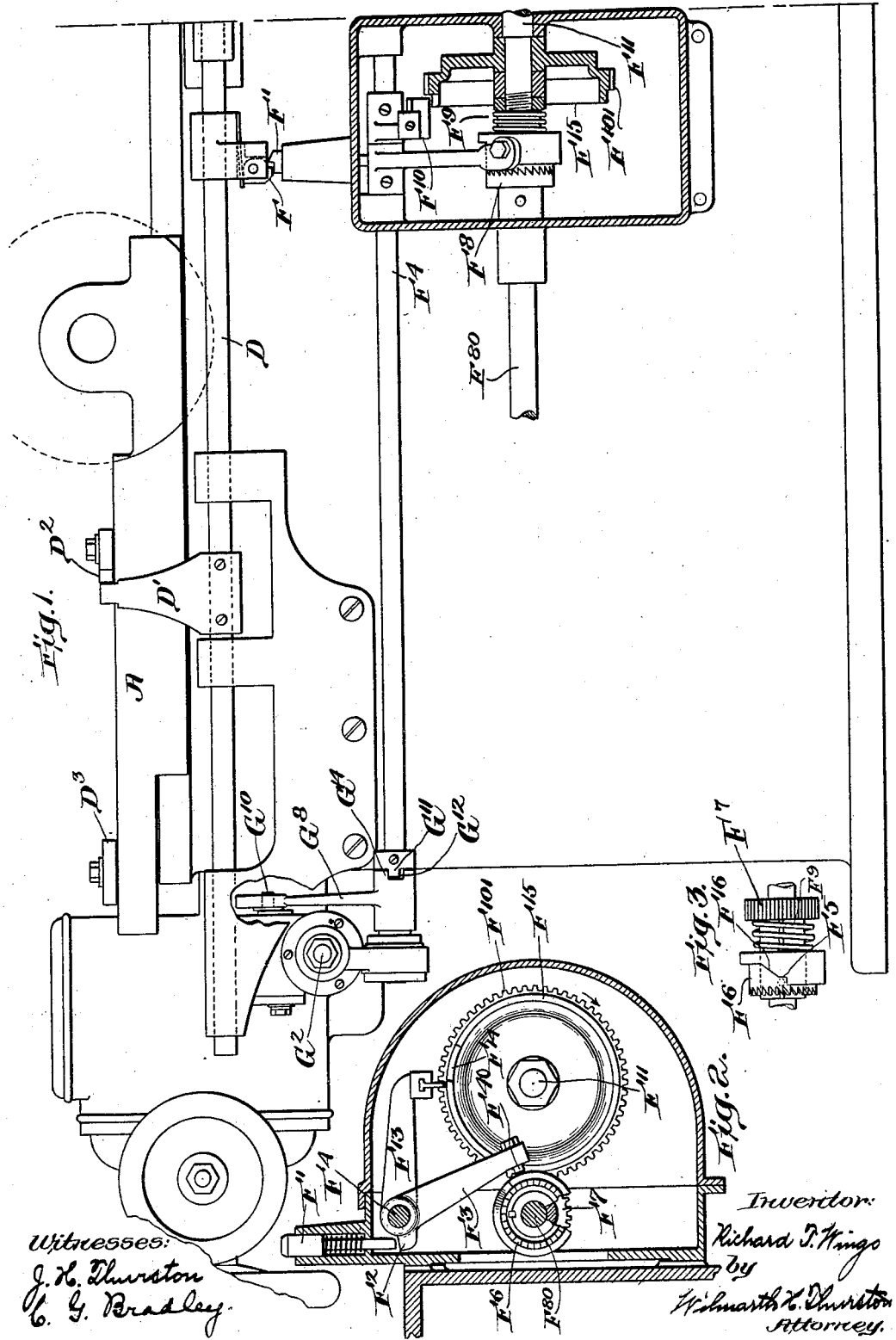
Witnesses:
J. H. Thurston
C. G. Bradley
Inventor:
Richard T. Wingo
by
Wilmarth H. Thurston
Attorney.

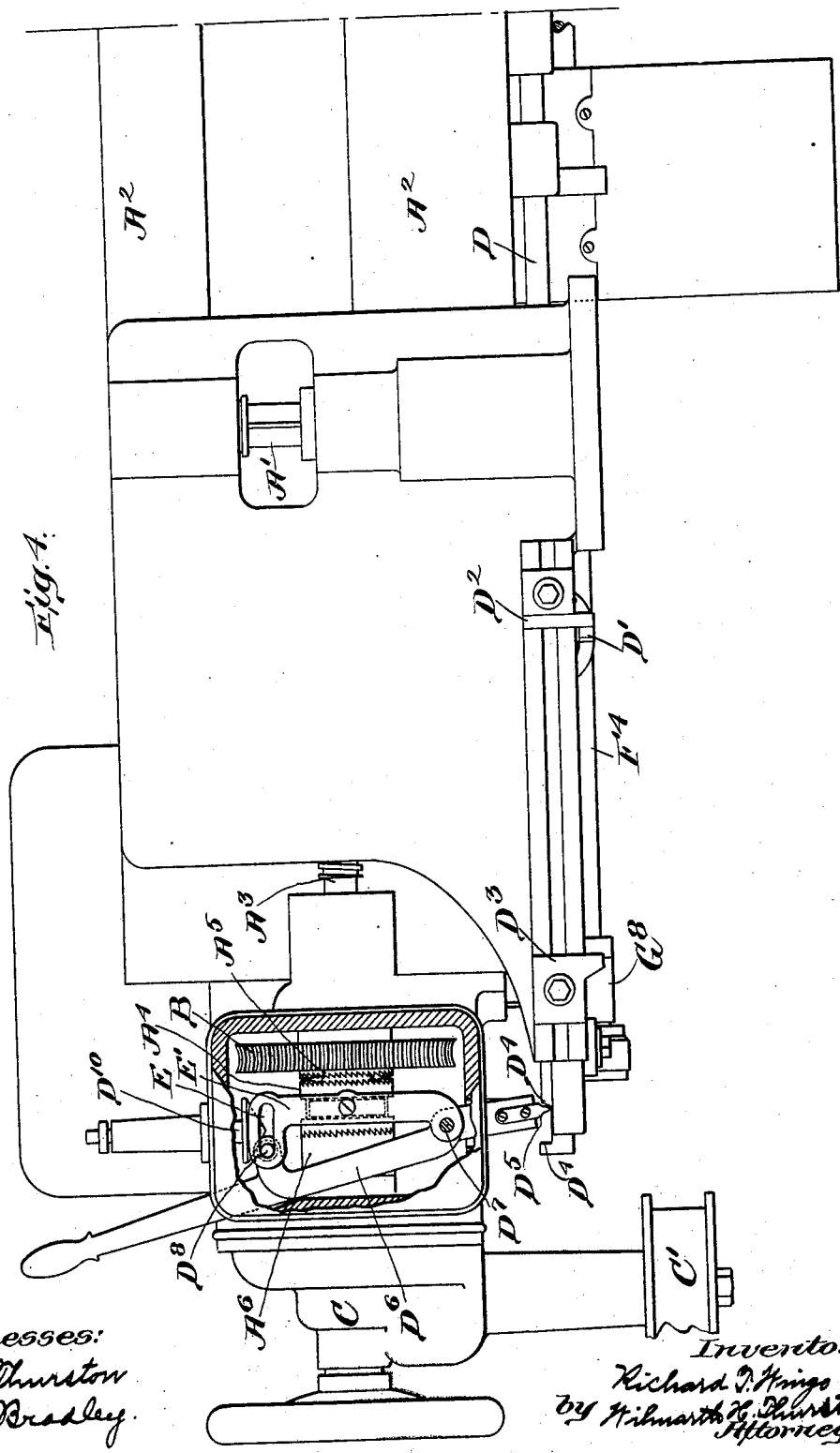

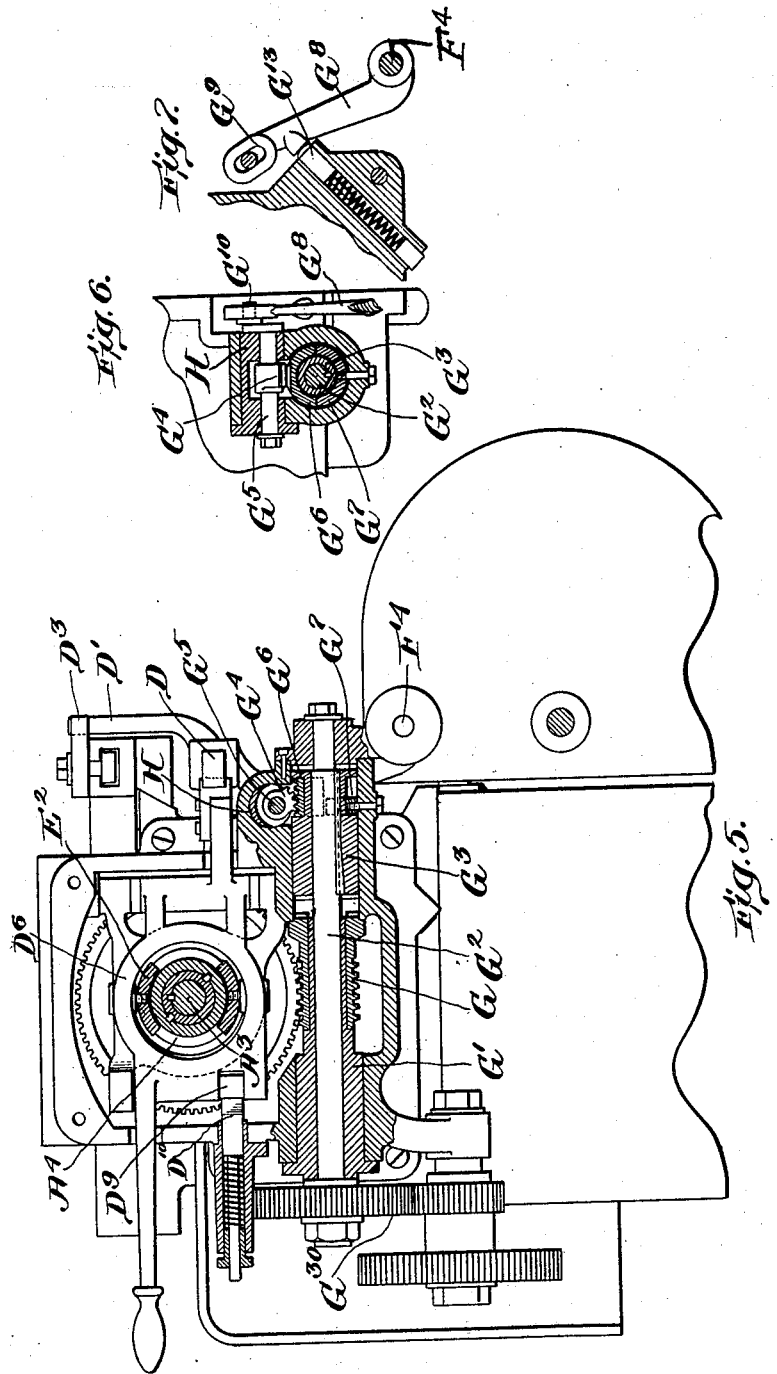

UNITED STATES PATENT OFFICE.

RICHARD T. WINGO, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

METAL-WORKING MACHINE.

No. 897,440.  Specification of Letters Patent.  Patented Sept. 1, 1908.

Application filed January 16, 1904. Serial No. 189,320.

*To all whom it may concern:*

Be it known that I, RICHARD T. WINGO, of Providence, in the county of Providence and State of Rhode Island, have invented certain new and useful Improvements in Metal-Working Machines; and I do hereby declare the following specification, taken in connection with the accompanying drawings, forming a part of the same, to be a full, clear, and exact description thereof.

The invention relates to that class of metal working machines in which either a cutter or the work is mounted upon a reciprocating carriage and in which the work or cutter is indexed or spaced after each cutting operation to bring the cutter and work into proper relation for the next cut. In this class of machines the reciprocating carriage is usually fed forward during the cutting operation by a slowly rotating feeding member and is quickly returned after the cut has been completed by a rapidly moving return member, the motion of the carriage being reversed at each end of its stroke by disconnecting one of these members from the carriage and connecting the other member with the carriage. The device, which is usually a clutch, for connecting and disconnecting the feed and return members with the carriage to reverse the movement of the carriage is usually controlled by the movement of the carriage and the indexing mechanism for changing the relation of the work and cutter after each cut is usually thrown into operation by devices on the carriage as the carriage approaches its rearward position. In this class of machines it is essential to the proper operation of the machine that the indexing be completed before the carriage is advanced to bring the cutter and work into engagement as otherwise the work or the cutter or both would be injured or ruined.

The present invention relates to devices for preventing the forward feed of the carriage in case the indexing mechanism fails to complete its movement in proper time or fails to throw out of operation at the proper time, thus insuring the proper spacing or indexing before the feeding movement of the carriage begins.

In practicing the invention I provide means for throwing the driving mechanism for the feed member out of operation during the indexing so that the feeding member remains stationary until the indexing has been completed and consequently the forward movement of the carriage cannot take place while the indexing mechanism remains in operation. I control this means for throwing the driving mechanism for the feeding member out of operation from the indexing mechanism so that the driving mechanism is thrown out of operation whenever the indexing mechanism is thrown into operation and is again thrown into operation when the indexing mechanism comes to rest in the proper position.

In embodying the above broad features of the invention in a simple and efficient construction well adapted for use in connection with automatic gear cutting machines, I throw the driving mechanism for the feeding member into and out of operation by means of a clutch introduced in the driving mechanism and I provide intermediate connections between the clutch and the indexing mechanism whereby the operation of the devices which start the indexing mechanism causes the disengagement of the clutch, while the return of the parts of the indexing mechanism to their normal position causes the reëngagement of the clutch. The specific construction and arrangement of the parts of the mechanism for throwing the driving mechanism of the feed member into and out of operation will vary with the specific construction and arrangement of the other mechanisms of the machine in which the invention is embodied.

In embodying the invention in a gear cutting machine I have employed features of invention relating more or less to details of construction which are of advantage in contributing to simplicity and efficiency, although not essential to the broader features of invention.

The various features and combinations constituting the invention will be understood from the following detailed description of the mechanism embodying these features shown in the accompanying drawings.

In these drawings Figure 1 is a side elevation of so much of an automatic gear cutting machine as is necessary to show the application of the present invention thereto. Fig. 2 is a detail partly in section showing an end view of the indexing mechanism. Fig. 3 is a detail of the index mechanism clutch, the spring being omitted. Fig. 4 is a plan view of the machine. Fig. 5 is an end elevation with parts removed and other parts broken away and shown in section to clearly illustrate the clutch for throwing the driving mechanism for the feeding member into and out of operation. Figs. 6 and 7 are sectional details of the devices for operating this clutch.

In the construction of machine shown in the drawings a reciprocating cutter carriage A carrying a rotating cutter spindle $A'$ is mounted to reciprocate upon ways $A^2$ in the usual manner. The carriage is moved back and forth by a screw $A^3$ mounted to rotate in suitable bearings and engaging a nut (not shown) on the carriage. The screw is driven to move the carriage in one direction or the other through a clutch $A^4$ mounted to rotate with the screw but free to slide thereon. This clutch is mounted between two clutch members $A^5$ $A^6$ which rotate in opposite directions and at different speeds. The clutch member $A^5$ is formed on the hub of a worm-wheel B which is driven at a slow rate of speed and in a direction to feed the carriage forward when the clutch $A^4$ is in engagement with the clutch member $A^5$, the worm-wheel and clutch member thus forming a feed member for feeding the cutter carriage during the cutting operation. The clutch member $A^6$ is formed on the hub of a gear located within the casing C (Fig. 4) and driven at a high rate of speed from the pulley $C'$ in a direction to return the cutter carriage when the clutch $A^4$ is in engagement with the clutch member $A^6$. The clutch member $A^6$ thus forms a return member for quickly retracting the carriage, and the clutch $A^4$ forms a reversing device for connecting either the feed member or the return member with the carriage.

The movement of the clutch from one rotating clutch member to the other is controlled by the movement of the carriage through a shipping bar D mounted in suitable guides at the side of the machine and provided with a dog $D'$ arranged between the operating dogs $D^2$ $D^3$ adjustably mounted upon the carriage A. This shipping bar D is provided with two shoulders $D^4$ arranged to act against the end $D^5$ of a clutch operating lever $D^6$. When the shipping bar D is moved toward the left in Figs. 1 and 4 by the engagement of the dog $D^2$ with the dog $D'$, as the carriage is being retracted, one of the shoulders $D^4$ operates against the end $D^5$ of the lever $D^6$ and swings the end of the lever beyond the pivot $D^7$ toward the right. During the movement of the lever $D^6$ by the carriage, a pin $D^8$ on said lever moves idly in a slot E in the end of a lever $E'$ which is connected with the clutch $A^4$ by means of pins engaging shoes $E^2$ which are arranged in an annular groove in the clutch. This movement of the lever $D^6$ also forces a roll $D^9$ on said lever over the V-shaped end of a spring plunger $D^{10}$ which yields to allow the passage of the roll. As the roll passes the apex of the V the pin $D^8$ reaches the end of the slot E and both the lever $D^6$ and lever $E'$ are thrown suddenly toward the right by the forward movement of the spring plunger thus shifting the clutch $A^4$ from the clutch member $A^6$ into engagement with the clutch member $A^5$. The feed wheel B is now connected with the carriage and as it rotates feeds the carriage forward until the dog $D^3$ strikes the dog $D'$ shifting the bar $D^6$ toward the right. This movement of the bar D brings the opposite shoulder $D^4$ against the end $D^5$ of the lever $D^6$ operating said lever to throw the clutch $A^4$ from the clutch member $A^5$ into engagement with the clutch member $A^6$. Thus the carriage is moved back and forth by the return and feed members and the movement of the carriage automatically controls the shifting of the reversing clutch from one member to the other.

The indexing mechanism for spacing the work after each cut is shown in Figs. 1 and 2. This mechanism is thrown into operation by the movement of the shipping bar D toward the left as the carriage approaches the end of its return sroke. The bar D carries a pivoted dog F arranged to be brought into engagement with a pin $F'$ by the movement of the bar D toward the left. As this dog passes over the pin $F'$ in moving toward the left it depresses the pin and starts the indexing mechanism into operation. In the drawings the parts are shown in the position which they occupy just after the dog F has passed over the pin $F'$ and before the movement of the bar D toward the left has continued far enough to shift the clutch $A^4$ from the return clutch member $A^6$ into engagement with the feed clutch member $A^5$ and in the drawings the carriage is still moving toward the left. When the pin $F'$ is depressed by the dog F it engages a lug $F^2$ projecting from an arm $F^3$ secured to a rock shaft $F^4$ thus rocking the arm $F^3$ toward the right in Fig. 2. This movement of the arm $F^3$ lifts a pin $F^{40}$ carried thereby out of engagement with shoulder $F^5$ which is formed on a clutch member $F^6$ of the indexing clutch. The clutch member $F^6$ is mounted on the hub of a pinion $F^7$ so that the clutch member rotates with the pinion but is free to slide thereon and the clutch member is forced toward a continuously rotating clutch member $F^8$ secured to the shaft $F^{80}$ by a spring $F^9$. While the pin $F^{40}$ is in engagement with the shoulder $F^5$ it holds the clutch member $F^6$ out of engagement with the clutch member $F^8$ against the tension of the spring $F^9$ and the indexing mechanism is out of operation. When the shaft $F^3$ is rocked as above described and the pin $F^{40}$ disengages the shoulder $F^5$, the spring $F^9$ engages the clutch member $F^6$ with the clutch member $F^8$ so that the pinion $F^7$ starts to rotate. The rotation of the pinion $F^7$ rotates a gear $F^{101}$ secured upon the end of a shaft $F^{11}$ the rotation of which rotates the work spindle through suitable and well known mechanisms (not shown). The rocking of the arm $F^3$ and rock shaft $F^4$ when the pin $F'$ is depressed also lifts a shoe $F^{10}$ carried by an arm $F^{10}$ secured to said shaft out of a slot $F^{14}$ formed in a flange $F^{15}$ on the gear $F^{101}$. When the dog F has passed the pin $F'$ the pin immediately returns to its upper position as indicated in Fig. 1 but the arm $F^3$ is held in its raised position by the engagement of the shoe $F^{10}$ with the flange $F^{15}$. The arm $F^3$ will therefore remain in its raised position until the slot $F^{14}$ in the flange $F^{15}$ comes under the shoe $F^{10}$. When this occurs the arm $F^{13}$ will drop down swinging the arm $F^3$ forward so that the pin $F^{40}$ will be in the path of a cam $F^{16}$ on the clutch member $F^6$. Now when the cam $F^{16}$ engages the pin $F^{40}$ the clutch member $F^6$ will be moved back against the tension of the spring $F^9$ thus disengaging the clutch and throwing the indexing mechanism out of operation. As shown the parts are so arranged that the indexing shaft $F^{11}$ is given a single revolution each time the rock shaft $F^4$ is operated by the dog F and pin $F'$ and the indexing mechanism is then thrown out of operation and remains in this condition until the shaft $F^4$ is again rocked to throw it into operation. There is no novelty in this form of indexing mechanism and it is shown merely as an illustration of one type of indexing mechanism with which the features of the invention may be employed. The construction and arrangement of the other parts of the machine already described are also such as have heretofore been used in gear cutting machines.

I will now describe the devices which I have combined with the mechanisms already described in practicing my invention.

As best shown in Fig. 5 the worm-wheel B is engaged and driven by a worm G loosely mounted on a stationary sleeve $G'$. The worm G is rotated from a constantly rotating shaft $G^2$ connected through gearing indicated at $G^{30}$ with any suitable source of power. The worm G is connected with and disconnected from the shaft $G^2$ to throw the driving mechanism for the worm-wheel B into and out of operation by means of a clutch $G^3$ keyed to slide on the shaft $G^2$ and provided with clutch teeth arranged to engage clutch teeth formed on the end of the worm G. The clutch $G^3$ is moved longitudinally on the shaft $G^2$ to throw it out of and into engagement with the worm G by means of a gear segment $G^4$ secured to a rock shaft $G^5$ and engaging rack teeth formed on a shoe $G^6$. The shoe $G^6$ is mounted in an annular groove in the clutch $G^3$ and is held from rotation and supported by a fixed yoke $G^7$. The yoke $G^7$ is of such width that it does not interfere with the longitudinal movement of the clutch $G^3$. The rock shaft $G^5$ is rocked in a direction to disengage the clutch $G^3$ when the indexing mechanism is thrown into operation and is rocked in the opposite direction to engage the clutch $G^3$ when the indexing mechanism has returned to its normal position. The connections between the shaft $G^5$ and the indexing mechanism consist of an arm $G^8$ operated by the rock shaft $F^4$ and provided with a slot $G^9$ engaging a crank pin $G^{10}$ on the end of the shaft $G^5$. The arm $G^8$ is loosely mounted on the rock shaft $F^4$ and is connected therewith by a lug $G^{11}$ projecting into a recess $G^{12}$ formed in the hub of arm $G^8$ (Fig. 1). The arm $G^8$ is acted upon by a spring pressed plunger $G^{13}$ which tends to move the arm in a direction to engage the clutch $G^3$ with the worm G and also to hold the shoulder $G^{14}$ on the hub of the arm in engagement with the lug $G^{11}$.

When the shaft $F^4$ is rocked to throw the indexing mechanism into operation the lug $G^{11}$ acting against the shoulder $G^{14}$ rocks the arm $G^8$ against the tension of the spring $G^{13}$ into the position indicated in the drawings, thus operating the gear segment $G^4$ to withdraw the clutch $G^3$ from engagement with the worm G. This disconnects the worm G from its driving shaft $G^2$ and thus throws the driving mechanism for the feed member B out of operation. The worm-wheel B now remains at rest until the shaft $F^4$ returns to its normal position which can only occur when the indexing mechanism has operated properly and come into its normal position. When the shaft $F^4$ returns to its normal position at the end of the indexing operation, the arm $G^8$ is moved by the spring $G^{13}$ in a direction to reëngage the clutch $G^3$ with the worm G and thus throw the driving mechanism for the worm-wheel B into operation. The recess in the hub of the arm $G^8$ within which the lug $G^{11}$ lies is of sufficient width to allow the shaft $F^4$ to return to its normal position independently of the arm $G^8$. This form of connection is employed between the shaft $F^4$, and the arm $G^8$ and said arm is operated by a spring to engage the clutch, so that the clutch may be properly engaged in case the edges of the teeth strike each other as the clutch is forced toward the worm G.

For convenience in the manufacture and assembling of the parts the shaft $G^5$ which carries the pinion $G^4$ is mounted in the eccentric bushing H. With this construction the gear segment and shaft may be mounted in the bushing and these parts introduced into the bearing for the bushing and the bushing then turned to bring the segment into engagement with the rack. The eccentric bushing also enables the shaft $G^5$ to be adjusted so that the teeth of the gear segment will mesh properly with the gear teeth on the shoe G⁶.

What I claim as my invention and desire to secure by Letters Patent is:

1. The combination, with a carriage, of a feed-member for advancing the carriage, a return member for retracting the carriage, driving mechanism for said feed-member, an indexing mechanism, and means for throwing said driving mechanism out of operation during the indexing, substantially as described.

2. The combination, with a carriage, of a feed member for advancing the carriage, driving mechanism therefor, an indexing mechanism, and means controlled by the indexing mechanism for throwing said driving mechanism out of operation as the indexing begins and throwing said driving mechanism into operation when the indexing is completed, substantially as described.

3. The combination, with a carriage, of a feed member for advancing the carriage, a return member for retracting the carriage, a reversing device controlled by the carriage, driving mechanism for the feed member, an indexing mechanism, and means for throwing said driving mechanism out of operation during the indexing, substantially as described.

4. The combination, with a carriage, of a feed member for advancing the carriage, a clutch for connecting the feed member with the carriage, driving mechanism for the feed member, a clutch in said driving mechanism, an indexing mechanism, and means for disengaging said latter clutch during the indexing, substantially as described.

5. The combination, with a carriage, of a feed member for advancing the carriage, a clutch for connecting the feed member with the carriage, driving mechanism for the feed member, a clutch in said driving mechanism, an indexing mechanism, and connections between said latter clutch and indexing mechanism for controlling the engagement of the clutch, substantially as described.

6. The combination, with a carriage, of a feed member for advancing the carriage, driving mechanism therefor, a clutch in said driving mechanism, an indexing mechanism, and intermediate connections between the clutch and indexing mechanism for disengaging the clutch as the indexing starts, and reëngaging the clutch as the indexing mechanism comes to normal position, substantially as described.

7. The combination, with a carriage, of a feed member, a return member, a reversing clutch for connecting either member with the carriage, an indexing mechanism, and means for throwing the driving mechanism of the feed member into and out of operation from the indexing mechanism, substantially as described.

8. The combination, with a carriage, of a feed member, a return member, a reversing clutch for connecting either member with the carriage, an indexing mechanism, a second clutch for controlling the operation of the feed member controlled by the indexing mechanism, substantially as described.

9. The combination, with a carriage, of a feed member, a return member, a reversing clutch for connecting either member with the carriage, an indexing mechanism a second clutch for controlling the operation of the feed member, and means for throwing said latter clutch out of operation during the indexing, substantially as described.

10. The combination, with a carriage, of a feed member therefor, an indexing mechanism, a clutch for controlling the operation of the feed member, connections between the clutch and indexing mechanism for disengaging said clutch as the indexing begins, and engaging said clutch as the indexing is completed, substantially as described.

11. The combination, with a carriage, of a feed member, a clutch for connecting the feed member with the carriage, an indexing mechanism, a clutch for controlling the operation of the feed member, means for disengaging said clutch at the beginning of the indexing and engaging said latter clutch at the completion of the indexing, substantially as described.

12. The combination, with a carriage, of a feed member therefor, a clutch through which said member is driven, an indexing mechanism, a controlling device for the indexing mechanism, and connections between said device and clutch for disengaging and engaging said clutch, substantially as described.

13. The combination, with a carriage, of a feed member therefor, a clutch through which said member is driven, an indexing mechanism, a trip for starting and stopping the index mechanism, and connections between said trip and clutch for disengaging and engaging said clutch, substantially as described.

14. The combination, with a carriage, of a feed member therefor, a return member therefor, a clutch through which said feed member is driven, an indexing mechanism, a rock shaft operated in opposite directions at the beginning and end of the indexing, and connections between said shaft and clutch, substantially as described.

RICHARD T. WINGO.

Witnesses:
W. H. THURSTON,
J. H. THURSTON.